United States Patent [19]
Vitale et al.

[11] 3,766,009
[45] Oct. 16, 1973

[54] PROCEDURE FOR ENZYMATIC PRODUCTION OF SEMI-SYNTHETIC PENICILLINS

[75] Inventors: Eupremio Vitale; Guido Guerra, both of Bologna, Italy

[73] Assignee: Alfa Farmaceutici S.p.A., Bologna, Italy

[22] Filed: Nov. 10, 1971

[21] Appl. No.: 197,513

[30] Foreign Application Priority Data
Nov. 7, 1970 Italy.................................. 3608 A/70

[52] U.S. Cl. ................................................. 195/29
[51] Int. Cl............................................... C12d 9/00
[58] Field of Search .......................... 195/36 P, 29

[56] References Cited
UNITED STATES PATENTS
3,239,427   3/1966   Huang et al. ...................... 195/36 P Primary Examiner—Alvin E. Tanenholtz
Attorney—Richard K. Stevens et al.

[57] ABSTRACT

A process for the enzymatic hydrolysing of diacyl-penicillins to semi-synthetic penicillins of the general formula:

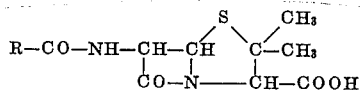

The hydrolysis takes place in the presence of the enzyme penicillin-acylase produced by microorganisms.

11 Claims, No Drawings

PROCEDURE FOR ENZYMATIC PRODUCTION OF SEMI-SYNTHETIC PENICILLINS

The present invention is concerned with a new enzymatic procedure for the preparation of semi-synthetic penicillins. More specifically, it refers to a new enzymatic procedure to obtain semi-synthetic penicillins with the general formula (I):

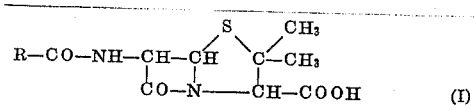
(I)

where R represents a group chosen among α-aminobenzyl, α-car-boxybenzyl, 2 or 3 thienylmethyl, 2 or 3 thienylaminomethyl, or an isoxazole group with the general formula:

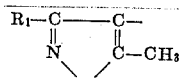

(in which $R_1$ indicates a phenyl group or a 2-chlorophenyl or 2,6 dichlorophenyl);
R can also represent a group with the formula:

in which $R_2$ indicates an aryl, aryloxyl, arylmercaptyl possibly substituted by one or more halogen atoms); $R_3$ indicates a hydrogen or a ($C_1$–$C_{10}$) alkyl group, ($C_1$–$C_{10}$) alkoxyl, amino, ($C_1$–$C_6$) monoalkyl-amino, ($C_1$–$C_6$) dialkyl-amino, carboxyl, ($C_1$–$C_8$) carboxyalkyl, carboxymethyl acetoxyl, carboxybenzyl, and, as a special case, $R_2$ and $R_3$ together can belong to a $C_5$–$C_7$ cycloaliphatic ring;
$R_4$ represents hydrogen or, in the special case where $R_2$ and $R_3$ together form a $C_5$–$C_7$ cycloaliphatic ring, $R_4$ represents an amino, ($C_1$–$C_6$) monoalkylamino, or ($C_1$–$C_6$) dialkylamino group.

The present invention refers also to the preparation of non-toxic salts and esters of semi-synthetic penicillins with formula (I). Such non-toxic salts include those of sodium, potassium, calcium, magnesium, aluminum, ammonium and substituted ammonium, such as those formed by reaction with non-toxic amines, e.g., triethylamine, procaine, dibenzylamine, N-benzyl-β-phenylethylamine, N,N'-dibenzylethylendiamine, N-alkylpiperidin, and other amines which are usually employed to form salts with benzyl penicillin.

Among the non-toxic esters of semi-synthetic penicillins with formula (I) can be quoted: ($C_1$–$C_6$) alkyl, ($C_1$–$C_8$) acyloxymethyl, p-methoxybenzyl, p-nitrobenzyl, benzyhydryl, phenacyl; p-bromophenacyl, trimethylsilyl, benzyl.

More specifically, the present invention concerns an enzymatic procedure for the preparation of semi-synthetic penicillins, specified above in formula (I), (or of their non-toxic salts or esters) characterized by the fact that said procedure includes the enzymatic dephenylacetylation of diacylpenicillins with the general formula (II):

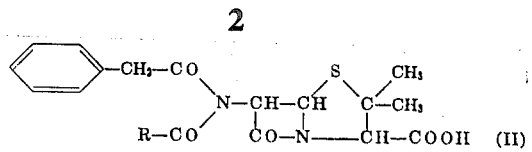
(II)

(where R has the same meaning as specified above) performed in aqueous medium at a temperature between 20°C and 50°C, preferably between 30°C and 42°C, at an alkaline pH, preferably between pH 7.1 and 8.5.

According to the present invention, the enzymatic dephenylacetylation of diacylpenicillins with formula (II) occurs by action of the enzyme penicillin-acylase, produced by several microorganisms. The preparation of the semi-synthetic penicillins represented in formula (I) has been done up to now by chemical acylation of 6-amino-penicillanic acid. Different reactive derivatives of carboxylic acids were used for this reaction, such as acid chlorides, anhydrides or mixed anhydrides, or anhydrides coming from the corresponding free carboxylic acid and 6-amino-penicillanic acid in the presence of a condensing agent, as for instance dicyclohexylcarbodiimide. The 6-amino-penicillanic acid to be used was prepared by means of microciological hydrolysis of benzylpenicillin. These procedures are estensively described in scientific literature.

In the Belgian Pat. No. 738.110 a procedure is described covering exclusively the preparation of isoxazole penicillins, where these penicillins are obtained through a sequence of chemical reactions starting directly from benzylpenicillin. This process includes:
1. Protection of benzylpenicillin by esterification.
2. Preparation of an iminochloride of the protected benzyl-penicillin.
3. Reaction of this iminochloride with an alkaline salt of the required isoxazolic acid, to obtain protected diacylpenicillins.
4. Chemical dephenylacetylation by reaction of this product with a primary amine.
5. Removal of the protecting group to obtain the isoxazolyl penicillin.

Nevertheless, this procedure is subject to serious limitations. In fact it can be applied only to the preparation of isoxazolyl penicillins, in so far as the dephenylacetylation by chemical reaction with primary amines is feasible only in these limited cases due to steric hindrances of the isoxazole residue. Furthermore, during chemical dephenylacetylation, a considerable amount of epimerization is observed at position 6 in the penicillin molecule, with a resulting partial loss of antimicrobic activity. For such reason, other semi-synthetic penicillins of therapeutic or commercial interest cannot be prepared with this process.

The Applicant has now found, and this constitutes the object of the present invention, that the diacylpenicillins defined in formula (II) can easily be dephenylacetylated in high yields, without causing epimerization in position 6 of the penicillin nucleus, by enzymatic hydrolysis using the enzyme penicillin-acylase, which is highly specific for the phenacetyl group. Besides the fact that the present invention is particularly versatile, allowing the preparation of a great number of semi-synthetic penicillins, it has the advantage that by using mild treatments such as enzymatic dephenylacetylation, it does not produce epimerization phenomena of the hydrogen linked to the carbon atom in position 6 in the penicillinic structure of the molecule, as is often the case with chemical methods. The object of the present invention is, therefore, an enzymatic procedure for semi-synthetic penicillins (and their non-toxic salts and esters) defined above in the general formula (I). Said procedure is characterized by the fact that the dephenyl-acetylation of the diacylpenicillins specified in formula (II) is carried out by enzymatic hydrolysis in the presence of the enzyme penicillin-acylase, produced by microorganisms, at a temperature between 20°C and 50°C, preferably between 30°C and 42°C, and at an akaline pH, preferably between pH 7.1 and 8.5. The preparation of semi-synthetic penicillins, according to the present invention, occurs in the presence of penicillin-acylase or in the presence of enzymatic preparations from any source containing such enzyme.

For the enzymatic preparation of semi-synthetic penicillins defined in formula (I), microorganisms producing penicillin-acylase can be used, chosen among those capable of attacking the amide group in position 6 of the benzylpenicillin molecule, with the formation of 6-amino-penicillanic acid. This property can be evidenced through the fact that such microorganisms are able to inactivate penicillin G to the extent of at least 20 percent within 24 hours at 38°C, giving as a result a solution in which the penicillin G can be reactivated at least partially by addition of phenacetyl chloride. These microorganisms include molds, yeasts and bacteria and can be chosen among the following genera: Alternatia, Aspergillus, Botritis, Cephalosporium, Cryptococcus, Emericellopsis, Eipcoccum, Epiolermophyton, Fusarium, Mucor, Penicillum, Phoma, Trichoderma, Trichophyton, Trichosporon, Streptomyces, Aerobacter, Alcaligenes, Bordetella, Cellulomonas, Corynebacterium, Erwinia, Escherichia, Flavobacterium, Micrococcus, Proteus, Pseudomonas, Salmonella, Sarcina, Xantomonas, Torulopsis, Rhodotorula, Arthrobacter.

These microorganisms can be used for the enzymatic synthesis of penicillin, as in formula (I), according to the present invention either under the form of cells collected from culture media or as acetonic powders, or as cells adsorbed on an inert carrier or, finally, in the form of cellular extracts (enzymatic preparations). In the scope of the present invention it is advantageous, but not essential, to use as source of enzymes specially selected microbic strains, which by mutations and successive passages have been made resistant to high concentrations of phenylacetic acid (1,000–3,000γ/ml), and are thus able to produce large amounts of the enzyme penicillin-acylase.

Therefore, the enzymatic procedure for the preparation of penicillins specified in formula (I) consists in the dephenylacetylation of diacylpenicillins as in formula (II) by enzymatic hydrolysis in the presence of penicillin-acylase producing microorganisms, or of an enzymatic preparation containing penicillinacylase, at a temperature compatible with the stability of both the enzymatic system and the penicillin molecule. Such temperature includes the interval between 20°C and 50°C, preferably between 30°C and 42°C.

As any enzymatic process, the enzymatic dephenylacetylation of diacylpenicillins such as formula (II) is sensitive to variations of pH. To obtain semi-synthetic penicillins according to the present invention the dephenylacetylation is performed in the pH interval between 7.1 and 8.5, preferably between 7.5 and 8.0.

The quantity of diacylpenicillin as in formula (II) which can be dephenylacetylated by a given amount of enzymatic material within a time lapse compatible with both industrial requirements and stability of the penicillin molecule depends on the enzymatic activity present in the biological material to be used. Therefore, it is advantageous to determine, a priori; such activity based on the capacity of penicillin-acylase to hydrolize penicillin G into 6-amino-penicillanic acid and phenylacetic acid. For successful execution of the procedure described in the present invention, for each mole of diacylpenicillin as in formula (II) one shall use that amount of biological material capable of splitting into 6-amino-penicillanic acid a mole of benzylpenicillin, at 37°C and at a constant pH of 7.8, in a 3 percent solution in 10 hours up to 65 percent of the theoretical.

At the end of the enzymatic reaction, the semi-synthetic penicillin formed can be isolated from the solution by means of different known techniques. A widely used method consists in the removal of the cellular or enzymatic material by filtration or centrifugation. The penicillin can be extracted from the clear solution obtained by means of an organic solvent, insoluble in water, after acidification with a strong acid. The penicillin can then be precipitated from the organic phase in the form of sodium salt by adding a saturated organic solution of sodium-2-ethyl-hexanoate. The precipitate is collected, by filtration, washed with a suitable solvent, and dried under vacuum.

The product so obtained is, in general, sufficiently pure for practical purposes. Alternatively, the penicillin can be precipitated in the form of a crystalline salt poorly soluble in water by adding a solution of a substance with which the penicillin forms the required insoluble salt. To this purpose, the salts of N,N'-dibenzylethylendiamine, dihydroabietylamine, procaine, N-ethylpiperidine, etc., can be advantageously used. The details for the performance of the procedures covered by the present invention are further illustrated by the following examples, which are not to be taken as restrictive in any respect.

EXAMPLE 1

Production of Escherichia coli penicillin-acylase producing cells.

Cells of a strain of Escherichia coli (ATCC 9637), previously made resistant to 2,000γ/ml of phenylacetic acid, are cultivated at a temperature of 30°C on a medium of the following composition:

| | |
|---|---|
| Corn steep liquor | 2.8% |
| Peptone | 0.1% |
| Casein hydrolisate | 1.0% |
| $Na_2HPO_4 \cdot 2H_2O$ | 1.8% |
| $K_2HPO_4$ | 1.8% |
| Vaseline oil | 0.02% |
| Na-phenylacetate | 0.2% |
| pH 6.8–7.0 | | in a laboratory fermenter under agitation (650 r.p.m.) and sparger aeration (6 liters per hour/liter) until the optical density of the medium reaches the value of 99/100 at the wavelength of 610 mμ, read on a colorimeter.

The growth normally takes 8–9 hours. After this time, the medium is centrifuged and the harvested cells are dispersed in an equal volume of saline. This suspension contains $5.5 \times 10^{10}$ cells per ml. To determine the enzymatic activity of the cellular suspension obtained as above, 10 ml of this suspension are incubated at 37°C and ph 7.8 with different amounts of sodium salt of benzylpenicillin. At regular time intervals, samples of the mixture are analyzed for the quantity of benzylpenicillin remaining intact. The results obtained are reported in the following table:

| Time of incubation at 37°C in hours | Quantity of benzylpenicillin in mg/ml | | |
|---|---|---|---|
| | 20 | 30 | 40 |
| 0 | | | |
| 2 | 12.6 | 23.4 | 36.5 |
| 4 | 8.8 | 19.3 | 31.2 |
| 6 | 6.3 | 15.6 | 27.7 |
| 8 | 4.1 | 12.4 | 24.4 |
| 10 | 2.3 | 10.8 | 21.3 |
| 12 | 1.7 | 8.5 | 18.7 |

As one can see, the transformation of about 65 percent in 10 hours is obtained with the solution which originally contained 30 mg/ml of benzylpenicillin.

EXAMPLE 2

Production of an enzymatic solution of penicillin-acylase from Escherichia coli.

Cells of a strain of Escherichia coli (ATCC 9637), made resistant to 2,000γ/ml of phenylacetic acid, are cultivated as described under Example 1. The harvested and washed cells are suspended in distilled water to a concentration of $10 \times 10^{10}$ cells/ml. The dispersion so obtained is layered with 3 percent (vol/vol) of methylisobutylketone, and the mixture is kept at 38°C for 6 hours. The cellular material is separated by centrifugation. The clear solution obtained shows an enzymatic activity capable of decomposing 65 percent of 43 mg/ml of benzylpenicillin in 10 hours at 38°C and at pH 7.8.

EXAMPLE 3

Procedure for the preparation of diacylpenicillins.

The procedure described in this example is not claimed under the present invention, but is only used to illustrate the method of preparation of diacylpenicillins, used as starting material for the preparation of semi-synthetic penicillins according to the present invention.

A. Preparation of the p-nitrobenzyl ester of benzylpenicillin (compound A).

To a mixture of 74.5 g of potassium benzylpenicillin plus 500 ml of dimethylformamide are added 39 g of p-nitrobenzyl bromide. The mixture is kept at 55°–60°C for 5 hours under agitation. The mixture is allowed to cool; is diluted with 300 ml of benzene, and is then poured into 500 ml of water. The organic phase is separated and washed three times with water to eliminate the benzylpenicillin which has not reacted. The benzene solution, dried by means of anhydrous $Na_2SO_4$, will be used directly without isolating the compound obtained. The analysis shows a content of benzylpenicillin ester corresponding to 70.8 g (yield: 75 percent).

B. Preparation of the acetoxymethyl ester of benzylpenicillin (compound B).

A mixture of 45.6 g of N-ethylpiperdine salt of benzyl-penicillin and 79 ml of bromomethylacetate in 200 ml of dimethylformamide is kept at room temperature for 16 hours under stirring. It is then diluted with 500 ml of chloroform and poured into water. The organic phase is washed repeatedly with water to eliminate any trace of unreacted benzylpenicillin. The washed solution is finally dried on anhydrous $Na_2SO_4$, and is used directly in the synthesis of diacylpenicillins. The organic solution obtained contains 33.6 g of the acetoxymethyl ester (yield: 8.1 percent).

C. Preparation of trimethylsilyl ester of benzylpenicillin (compound C).

74.5 g of potassium benzylpenicillin are dispersed in 750 ml of chloroform, and then, gradually, 32.6 ml of trimethylchlorosilane are added. During this addition the temperature must not rise above 26°C. After the addition, the mixture is kept at 25°–27°C for one hour under constant agitation. After filtration, the filtrate is utilized directly in the successive steps to prepare diacylpenicillins. The organic solution contains 79.6 g of trimethylsilyl ester of benzylpenicillin (yield: 96 percent).

D. General procedure for the preparation of iminochlorides of protected benzylpenicillin.

The organic solution containing 0.1 mole of protected benzyl-penicillin, prepared according to one of the points A,B,C is treated with 0.12 moles of quinoline and is cooled externally to −35°C. Under agitation, 0.1 mole of finely powdered $PCl_5$ is added, and the mixture is kept at −30° to −35°C for 3 hours, under constant agitation and protection from humidity. At the end of the reaction, the mixture is filtered from the quinoline HCl, the solvent is evaporated under reduced pressure, and the residue is repeatedly distilled under vacuum with anhydrous benzene at a temperature not above 25°C in order to remove the phosphorus oxychloride formed in the reaction. The residue, free from phosphorus oxychloride, is dissolved in 200 ml of anhydrous benzene and utilized directly for the preparation of protected diacylpenicillins. The yield is practically quantitative.

E. General procedure for the preparation of protected diacyl-penicillins.

The benzene solution obtained under D containing the iminochloride of the esterified benzylpenicillin, is treated with finely powdered sodium salt of the required carboxylic acid (0.15 moles). The mixture is kept under agitation at room temperature for a period of 20–24 hours. At the end of the reaction, the mixture is filtered from the excess of sodium salt and from the sodium chloride formed. The filtrate is washed repeatedly with water and with a 3 percent sodium bicarbonate solution (when trimethylchlorosilane is used for the protection of the benzylpenicillin, the washing procedure is modified and a 5 percent HCl solution used for the final wash. During this aqueous-acid washing, the trimethylsilyl ester of diacylpenicillin is hydrolized and will be found as free acid in the final benzene solution, from which it can be isolated as sodium salt by treatment with Na-2-ethylhexanoate.) By evaporation of the solution under reduced pressure, the raw protected diacyl-penicillin is obtained.

F. General procedure for the preparation of diacylpenicillins free from protecting groups.

1. Removal of the p-nitro benzyl group.

The removal of a p-nitro group can be achieved through several methods described in scientific literature, all based on cathalytic reduction. One can, for instance, proceed as follows: the residue obtained as under point E after evaporation of the solvent, is dissolved in 200 ml of ethyl acetate. The solution obtained is hydrogenated on 5 percent charcoal at atmospheric pressure in the presence of 10–14 ml of triethylamine, and 30 g of palladium catalyst. At the end of the reduction, the catalyst is removed and the solution is repeatedly extracted with water at pH 7.1–7.5. The pooled aqueous phases give by lyophylization the triethylamine salt of the desired diacylpenicillin.

2. Removal of the p-bromophenacyl protecting group. The residue obtained under point E after evaporation of the solvent, which consists of the p-bromophenacylic ester of diacylpenicillin, is dissolved in 150 ml of dimethylformamide. For 0.1 mole of initial product, 0.2 moles of sodium thiophenolate are added. The mixture is kept under agitation at room temperature for 30 minutes and then diluted with acetone. The raw sodium salt of the desired diacylpenicillin is precipitated and collected by filtration.

3. Removal of the acetoxymethyl protecting group. The residue obtained under point E is dissolved in ethyl ether and the resulting solution is kept under agitation at 0°C with a 5 percent HCl solution for half an hour. The organic phase is separated, washed with water, dried over $Na_2SO_4$ and treated with an equivalent amount of molar solution of sodium 2-ethylhexanoate in methylisobutylketone. The sodium salt of the diacylpenicillin desired is obtained as a precipitate.

EXAMPLE 4

Preparation of sodium salts of diacylpenicillins.

The preparations described under this example are not claimed under the present invention. Diacylpenicillins are prepared according to the general method described under Example 5. In the following table the data referring to the different preparations are reported:

PREPARATION OF DIACYLPENICILLINS

| Compound number | R | Protection°° | Percent yield |
|---|---|---|---|
| 1 | (phenyl)–C=C(CH₃)–N–O (isoxazolyl) | PBF | 44 |
| 2 | (2-Cl-phenyl)–C=C(CH₃)–N–O (isoxazolyl) | TMCS | 71 |
| 3 | (2,6-diCl-phenyl)–C=C(CH₃)–N–O (isoxazolyl) | TMCS | 69 |
| 4 | (phenyl)–CH(NH₂)– form D | TMCS | 63 |
| 5 | (phenyl)–CH(NH₂)– form D | PNBB | 67 |
| 5 | (phenyl)–CH(COONa)– | BMA | 72 |
| 6 | (phenyl)–CH(COOCH₂–phenyl)– | TMCS | 77 |
| 7 | (phenyl)–O–CH(CH₃)– | TMCS | 76 |
| 8 | (phenyl)–O–CH(CH₂–CH₃)– | TMCS | 76 |
| 9 | (2,6-diOCH₃-phenyl)– | TMCS | 67 |
| 10 | (2-OC₂H₅-naphthyl)– | PBF | 53 |
| 11 | (thienyl)–CH(NH₂)– form D | TMCS | 66 |
| 12 | (cyclohexyl)–NH₂ | TMCS | 51 |
| 13 | (thienyl)–CH(NH₂)– form D | TMCS | 63 |
| 14 | (cyclobutyl)–NH₂ | TMCS | 54 |

°°Protection = BMA = Bromomethylacetate; PBF = p-bromophenacyl bromide; TMCS = trimethylchlorosilane; PNBB = p-nitrobenzyl bromide.

EXAMPLE 5

Procedure for the preparation of Oxacillin.

53.6 g of sodium salt of N-(3-phenyl-5-methyl-isoxazolyl-4) benzylpenicillin (compound 1 of Example 4) are added to 1,000 ml of a cell suspension of Escherichia coli prepared as under Example 1. The pH is adjusted to 7.8 and the mixture is kept under agitation and moderate aeration at 36°–39°C for 12–15 hours. The pH of the mixture is constantly kept between 7.5 and 8.0 by adding a 5 percent soda solution. During this period, in order to neutralize the phenylacetic acid formed, 74 ml of the soda solution are used (92 percent of theoretical). At the end of the enzymatic hydrolysis, the suspension is centrifuged and the clear solution is cooled to 0°–5°C.

The solution is now treated, under agitation, first with 250 ml of ether and then with 10 percent HCl to reach pH 2.0. The organic phase is separated and washed three times with 100 ml of water, and dried over $Na_2SO_4$. The anhydrous ether solution is then treated with 100 ml of 1.0 molar sodium 2-ethyl-hexanoate in methylisobutylketone. The sodium salt of Oxacillin which precipitates is filtered and washed first with ether and then with dry isopropanol. After drying under vacuum, 39.1 g of product are obtained showing a microbiological titer of 89 percent (yield: 89 percent).

EXAMPLE 6

Procedure for the preparation of Chloxacillin. Using 7.5 g of sodium salt of N-[3(2-chlorophenyl)-5-methyl-isoxazolyl-4]benzylpenicillin (compound 2 under Example 4) and proceeding as described under Example 7, 41.6 g of Chloxacillin are obtained (yield: 90.6 percent) showing the following characteristics:

| | |
|---|---|
| MIcrobiological titer | 94% |
| $H_2O$ (Karl Fischer) | = 4.6% |
| Iodometric titer | = 96% |

EXAMPLE 7

Procedure for the preparation of Dichloxacillin.

61 g of compound 3 as under Example 4 (sodium salt of N[3(2,6-dichlorophenyl)5-methyl-isoxazolyl-4]benzylpenicillin) are used as described under Example 1. At the end of the enzymatic hydrolysis, the mixture centrifuged to remove the cellular material and the resulting clear solution is treated with one liter of methylisobutylketone. It is then acidified at 0°C with 10 percent HCl to reach pH of 2 and the organic phase is separated, washed repeatedly with water and dried over $Na_2SO_4$.

To the dry solution is added 120 ml of 1.0 molar Na-2-ethylhexanoate solution is methylisobutylketone and the mixture is heated to 25°–28°C under agitation. It is then kept at room temperature under constant agitation until it crystalizes completely. The precipitate is filtered and washed first with methylisobutylketone and then with ether, and dried under vacuum. 44.2 g of Dichloxacillin (yield: 88 percent) are obtained, having the following characteristics:

| | |
|---|---|
| Microbiological titer | = 91.3% |
| $H_2O$ (Karl Fischer) | = 4.2% |
| Iodometric titer | = 95.1% |

EXAMPLE 8

Procedure for the preparation of Ampicillin (D(-)α-amino-benzyl-penicillin).

59 g of compound 4 of Example 4 are dissolved in 1 liter of enzymatic solution of penicillin-acylase prepared as under Example 2. The pH is brought to 7.8 and the solution is kept at 36°–39°C for 9–12 hours. The pH is constantly kept between 7.5 and 8.0 with 5 percent soda. At the end of the enzymatic hydrolysis, the solution is cooled to 2°–5°C and acidified with 10 percent HCl to pH 1.5–2.0. The acid solution is extracted three times with 100 ml of methylisobutylketone. The extracted aqueous solution is concentrated under reduced pressure (25°–28°C) after correcting the pH to 7.0. The residue is filtered on a bed of filteraid mixed with active charcoal. The solution obtained is brought to pH 4.8–4.9 under agitation and external cooling.

The Ampicillin which precipitates in the form of trihydrate is collected by filtration and washed, first with a little ice water and then with 85 percent (vol/vol) isopropanol. It is then dried in a warm air stream (40°C). 41.6 g of Ampicillin trihydrate are obtained showing the following characteristics:

| | |
|---|---|
| MIcrobiological titer | = 89.6% |
| $H_2O$ (Karl Fischer) | = 12.8% |
| Hydroxamic titer | = 93.1% |
| $[\alpha]_D^{25} =$ (c=0.25% in $H_2O$ | = +276° |

EXAMPLE 9

Procedure for the preparation of 6[(−)α-amino-(2-thienyl)-acetamido] penicillanic acid.

Using 49.5 g of compound 11 as under Example 4 and proceeding as described under Example 8, 30.6 g of 6[(−)α-amino-(2-thienyl)-acetamido] penicillanic acid trihydrate are obtained (yield: 75 percent) having the following characteristics:

| | |
|---|---|
| Hydroxamic titer | = 92% |
| $H_2O$ | = 13.3% |
| $[\alpha]_D^{25}$ (c=0.5% in 0.1N HCl) | = +192° |

EXAMPLE 10

Procedure for the preparation of 6[1-amino-1 cyclohexyl-carboxamide] penicillanic acid.

Using 48 g of compound 12 as under Example 4 and proceeding as described under Example 8, 21.5 g of amorphous 6-(1-amino--1 cyclohexylcarboxamide penicillanic acid are obtained (yield: 64 percent) having the following characteristics:

| | |
|---|---|
| Iodometric titer | = 88% |
| Hydroxamic titer | = 90.3% |
| $H_2O$ (Karl Fischer) | = 3.8% |

EXAMPLE 11

Procedure for the preparation of 6-(1-amino-1-cyclopentyl-carboxamido) penicillanic acid.

Using 47 g of compound 13 as described under Example 4 and proceeding as described under Example 8, 19.6 g of 6-(1-amino-1-cyclopentyl-carboxamido penicillanic acid are obtained (yield: 58 percent) showing the following characteristics:

| | |
|---|---|
| Iodometric titer | = 91% |
| Hydroxamic titer | = 87% |
| $H_2O$ (Karl Fischer) | = 5.2% |

EXAMPLE 12

Procedure for the preparation of 6-[(−)-α-amino(3-thienyl)-acetamido] penicillanic acid.

49.5 g of compound 13 as described under Example 4 are dissolved in 500 ml of water, and to the solution are added 72 g (dry weight) of the enzymatic preparation obtained under Example 3. The pH is brought to 7.8 and the mixture is kept under agitation at 38°C for 8 hours, keeping the pH between 7.5 and 8 during this period. At the end of the hydrolysis, the suspension is filtered from the solids. The product is isolated from the filtrate with the procedure described under Example 8. 29.1 g of 6[(−)α-amino-(3-thienyl)-acetamido] penicillanic acid are obtained (yield: 71.2 percent), having the following characteristics:

| | |
|---|---|
| Hydroxamic titer | = 91.3% |
| Iodometric titer | = 93.1% |
| $H_2O$ (Karl Fischer) | = 13.6% |

EXAMPLE 13

Procedure for the preparation of Pheneticillin.

To 1,000 ml of Aerobacter alcaligenes bacterial paste (ATCC 13529) are added 50.5 g of sodium salt of compound 7, obtained as in Example 4. The suspension is kept under agitation at 38°C and pH 7.7–8.0 for 12 hours. At the end of the enzymatic hydrolysis, the mixture is centrifuged to remove the cellular material. The clear solution is extracted with 200 ml of methylisobutylketone. The extracted solution is layered with 250ml of methylisobutylketone, is cooled externally to 2°–5°C and acidified with 10 percent HCl to pH 2. The organic phase is separated from the aqueous phase and extracted two more times with 120 ml of methylisobutylketone. The pooled acid organic phases are washed with 100–150 ml of water and dried over $Na_2SO_4$. The anhydrous solution is treated with 165 ml of molar solution of potassium 2-ethyl-hexanote. The white precipitate formed is filtered, washed with acetone and dried under vacuum at 35°C. 34.6 g of potassium Pheneticillin are obtained (yield: 86 percent) showing the following characteristics:

| | |
|---|---|
| Iodometric titer | = 88.3% |
| $H_2O$ (Karl Fischer) | = 1.2% |
| Microbiological titer | = 86.2% |

EXAMPLE 14

Procedure for the preparation of Methicillin.

Using 52 g of compound 9 as under Example 4, proceed as described under Example 13. At the end of the enzymatic hydrolysis, the clear solution obtained after centrifugation is extracted at pH 2 with 350 ml of methylene chloride. The organic solution, washed with water and dried over $Na_2SO_4$, is treated with 120 ml of 1.0 molar solution of sodium 2-ethylhexanoate in methylisobutylketone. The white precipitate formed is collected by filtration, washed first with methylene chloride and then with acetone, and dried under vacuum at 35°–40°C. 28.7 g of sodium salt of Methicillin are obtained (yield: 71 percent).

We claim:

1. Enzymatic process for the preparation of semisynthetic penicillins of the general formula:

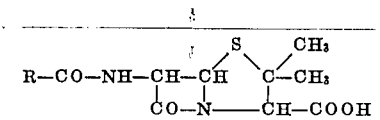

or their non-toxic salts or esters where R represents a group selected from 2 or 3 thienylmethyl, 2 or 3 thienylaminomethyl, an isoxazole group of the formula:

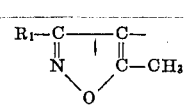

(wherein $R_1$ represents a phenyl group or a 2-chlorophenyl or 2,6 dichlorophenyl) and a group of the type:

wherein $R_2$ represents an aryl, aryloxyl, arylmercaptyl; $R_3$ represents a hydrogen atom or a ($C_1$-$C_{10}$) alkyl group, ($C_1$-$C_{10}$) alkoxyl, amino, ($C_1$-$C_6$) monoalkylamino, ($C_1$-$C_6$) dialkylamino, carboxyl, ($C_1$-$C_8$) carboxyalkyl, carboxymethylacetoxyl, carboxybenzyl and, as a special case, $R_2$ and $R_3$ together can belong to a $C_5$-$C_7$ cycloaliphatic ring; $R_4$ represents a hydrogen atom or, in the special case where $R_2$ and $R_3$ together form a $C_5$-$C_7$ cycloaliphatic ring, $R_4$ represents an amino, ($C_1$-$C_6$) monoalkylamino or ($C_1$-$C_6$) dialkylamino group; comprising enzymatically hydrolysing diacyl penicillins of the general formula:

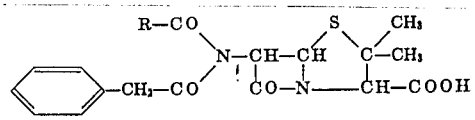

wherein R has the same meaning as specified above, in the presence of the enzyme penicillin-acylase produced by microorganisms.

2. The process of claim 1 wherein the enzymatic hydrolysis of the above specified diacyl penicillins occurs in an aqueous medium at a temperature between 20°C. and 50°C. at an alkaline pH.

3. The process of claim 1 wherein the enzymatic hydrolysis of the above specified diacylpenicillins occurs in the presence of penicillin-acylase producing microorganisms or in the presence of cellular extracts of such microorganisms containing penicillin acylase.

4. The process of claim 1 wherein the enzymatic hydrolysis of diacylpenicillins occurs in the presence of penicillin-acylase produed by microorganisms which are capable of attacking the amide group in position 6 in the benzyl-penicillin molecule with the formation of at least 20 percent of 6-amino-penicillanic acid within 24 hours at 38°C. and pH 7.8.

5. The process of claim 1 performed in the presence of penicillin-acylase produced by microorganisms selected from the group consisting of molds, yeasts and bacteria selected from the group consisting of Alternatia, Aspergillus, Botritis, Cephalosporium, Cryptococcus, Emericellopsis, Epicoccum, Epiolermophyton, Fusarium, Mucor, Penicillum, Phoma, Trichoderma, Tricophyton, Trichosporon, Streptomyces, Aerobacter, Alcaligenes, Bordetella, Cellulomonas, Corynebacterium, Erwinia, Escherichia, Flavobacterium, Micrococcus, Proteus, Pseudomonas, Salmonella, Sarcina, Xantomonas, Torulopsis, Rhodotorula, Arthrobacter.

6. The process of claim 1 wherein the hydrolysis medium contains enzymatic material in such an amount as to be able to hydrolize at 37°C. and pH 7.6 a 3 percent solution of benzylpenicillin in 10 hours to the extent of at least 35 percent.

7. The process of claim 1 wherein an Escherichia coli strain, resistant to 1,000–3,000 γ/ml of phenylacetic acid, is used as source of penicillin-acylase.

8. The process of claim 3 wherein, in the enzymatic hydrolysis of diacylpenicillins, the penicillin acylase producing microorganisms are used in the form of cells harvested from culture media, acetonic powders or as cells absorbed on inert carriers.

9. The process of claim 5 in which a microorganism chosen from the genus Escherichia is used as source of penicillin-acylase in the enzymatic hydrolysis of diacylpenicillins.

10. The process of claim 5 in which a microorganism chosen from the genus Aerobacter is used as source of penicillin-acylase in the enzymatic hydrolysis of diacylpenicillins.

11. The process of claim 5 wherein the penicillin-acylase producing microorganisms are resistant to 1,000–3,000 γ/ml of phenylacetic acid.

* * * * *